May 8, 1934.  W. J. SIMONDS  1,957,618

DEMOUNTABLE HUMP REEL

Filed Oct. 28, 1931  2 Sheets-Sheet 1

Inventor
Warren J. Simonds
By Attorneys

May 8, 1934. W. J. SIMONDS 1,957,618
DEMOUNTABLE HUMP REEL
Filed Oct. 28, 1931 2 Sheets-Sheet 2

Inventor
Warren J. Simonds
By Attorneys
Southgate Fay & Hawley

Patented May 8, 1934

1,957,618

UNITED STATES PATENT OFFICE 1,957,618

DEMOUNTABLE HUMP REEL

Warren J. Simonds, Orange, Mass., assignor to Rodney Hunt Machine Company, Orange, Mass., a corporation of Massachusetts Application October 28, 1931, Serial No. 571,619

5 Claims. (Cl. 242—118)

This invention relates to a reel ordinarily used by the textile trade in dyeing fabrics in dye kettles and the like.

The principal objects of this invention are to provide a construction wherein the humps may be quickly cleaned after being used in one color so that they can be used immediately for another color without carrying over one color to the other, thus saving time; to provide a construction in which all the old color can be removed so as to avoid an off-shaded result; to provide a construction of hump which can be applied to a bar reel and be removed and reapplied easily to adapt the reel for both of the uses of the bar reel and the hump reel, and to provide a construction in which the reel, in both cases, can be used in the same dye kettle.

Other objects and advantages of the invention will appear hereinafter.

Reference is to be had to the accompanying drawings, in which

The present invention relates to two of the reels used in dye kettles for dyeing textile fabrics, the so-called hump reel, which is provided with wooden humps on its surface, and the so-called bar reel, made up of longitudinal bars spaced apart around the circumference. The humps having been made of wood and secured to the drum in any desired way have taken up the dye color. When it is desired to change the color it is impossible to remove the old color entirely from the wooden humps, particularly where the grain is cut across, and an off-shade results.

With the present invention that difficulty is overcome by making the humps of smooth, preferably stainless, metal. This leaves no surface that cannot be cleaned easily and quickly. Another feature of the invention is the mounting of these humps removably so that they and their supporting means can be taken off by removing a few stud bolts, leaving the same reel in the form of a bar reel.

Heretofore bar reels and hump reels have had to be used in different dye kettles, but now, with this invention, they can be used in the same kettle. This introduces an economy although it is understood that the humps themselves cost more than the wooden humps and the expense of the reel is greater than either of the old types.

Figure 1:
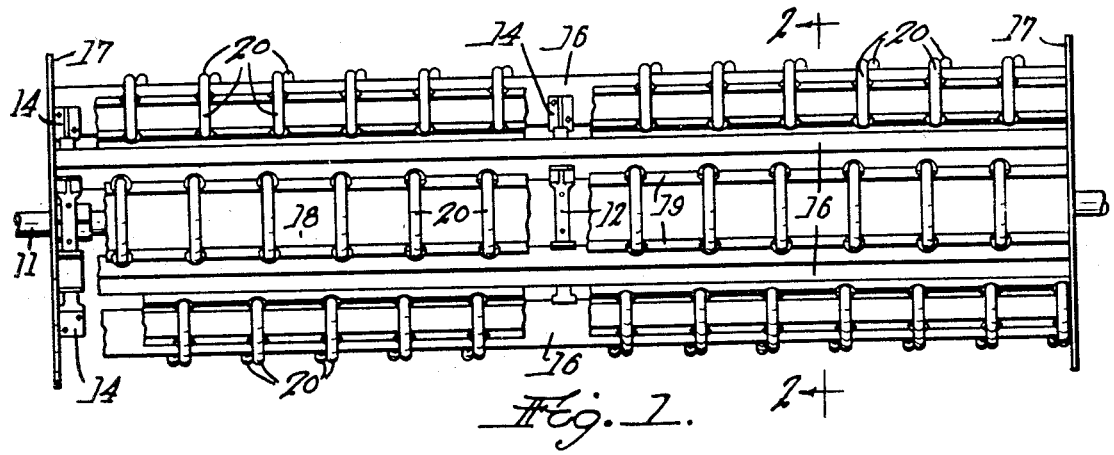
Fig. 1 is a plan of a hump reel constructed in accordance with this invention.
Figure 2:
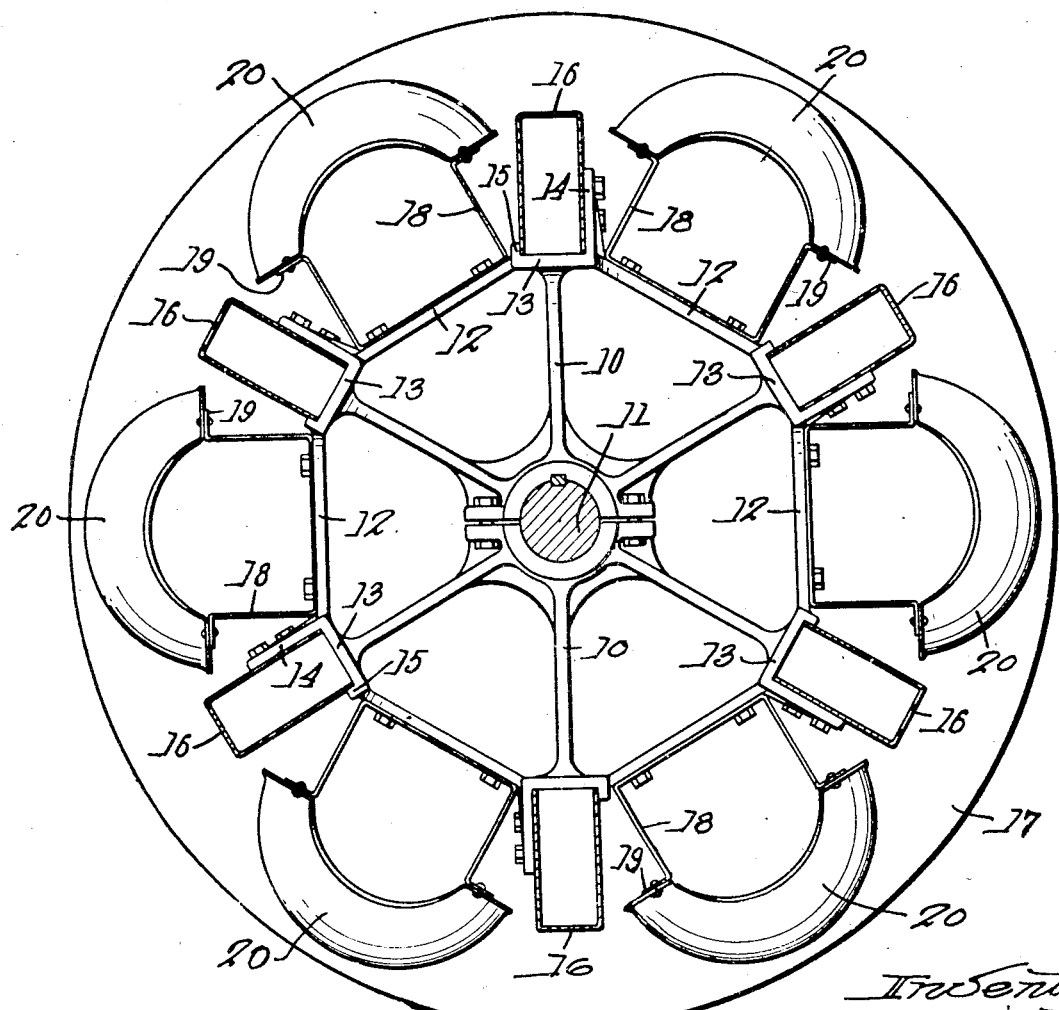
Fig. 2 is an enlarged transverse sectional view of the hump reel on the line 2—2 of Fig. 1.
Figure 3:
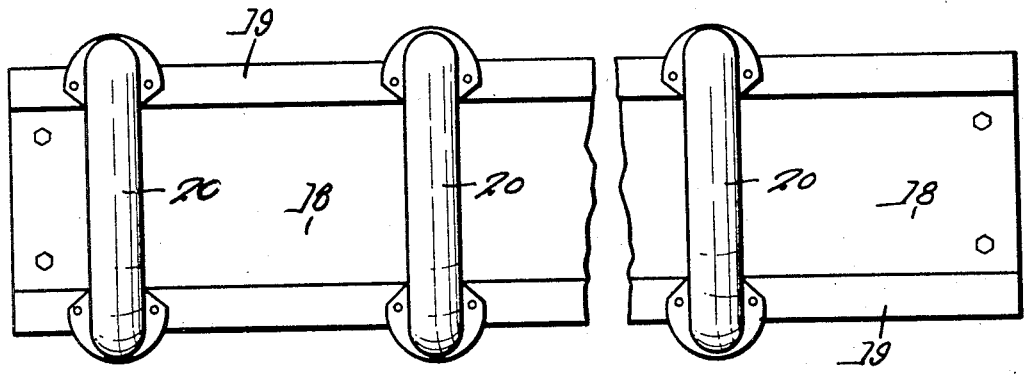
Fig. 3 is a plan of one course of humps, the same as shown in Fig. 1.
Figure 4:
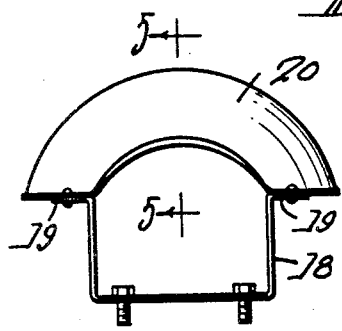
Fig. 4 is an end view of the same showing the supporting frame.
Figure 5:
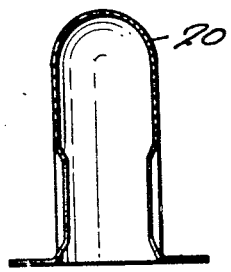
Fig. 5 is a sectional view on the line 5—5 of Fig. 4.
Figure 6:
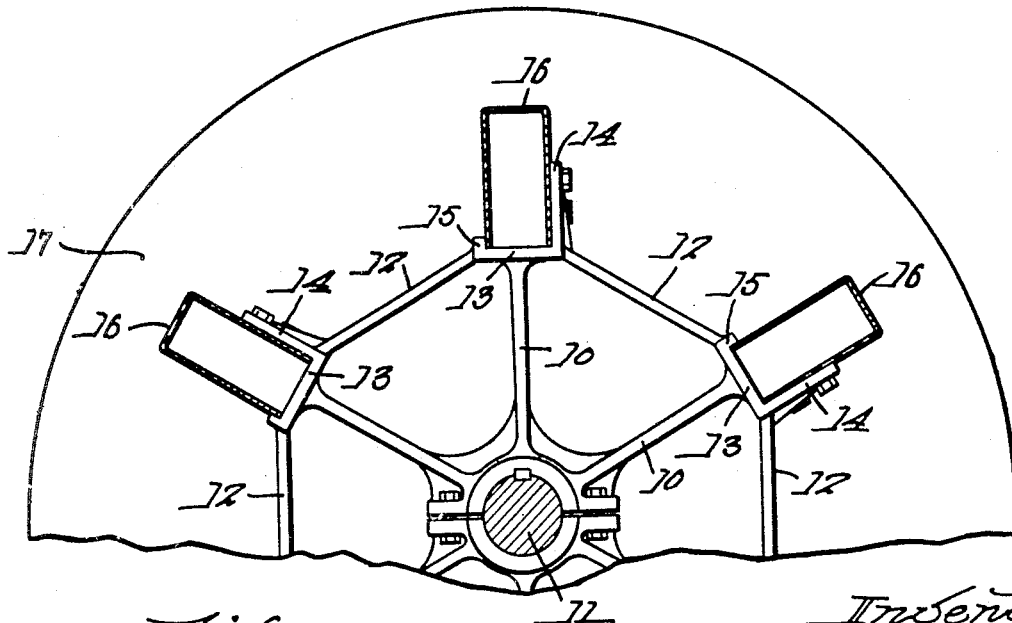
Fig. 6 is a view like Fig. 2, showing the bar reel converted over, by removing the humps and their supporting means, so that it serves as a bar reel only.

The reel is shown as comprising a spider 10 fixed on the central shaft 11. This spider has radiating arms and a peripheral surface which involves flat sides 12 and 13 alternating with each other. The flat sides or seats 13 in each case are provided with an integral radial plate 14 and with a ridge 15. Between the plate and ridge is located the bar 16 which is made of stainless sheet metal pressed to shape and having, preferably, a U-shaped cross section. One side of this bar is bolted to its plate 14 and the edge of the other side engages the ridge 15 which holds it in position. By reference to Fig. 6 it will be seen that this constitutes a bar reel having the usual flanges 17 at the ends.

For the purpose of converting this into a hump reel, frames 18 of U-shape are bolted to the surfaces or sides 12, one being located between each two bars 16. These frames project nearly to the edge of the bars and are provided with flanges 19 projecting in opposite directions. To these flanges are riveted, preferably, the humps 20. These humps preferably are made of stainless metal, as stated, and preferably are stamped out to the shape indicated so that the outer surfaces are of the same shape as was usual with the old wood humps fastened on a cylinder. They are hollow and arranged in staggered relationship. These rounded transverse humps insure the rolling of the goods to reduce dye wrinkles while the longitudinal bars act directly on the goods all the way across and move the goods in the vat by what amounts to a longitudinal motion.

A reel constructed as just described and as shown in Figs. 1 to 5 inclusive is suitable for performing the work of the old fashioned hump reel. Although it is more expensive, it has the very important advantage that the stainless smooth metallic external and internal surfaces of the hump can be cleaned very easily and cheaply when changing from one color to another. Therefore they do not carry over any of the old color and produce a shade that is not exactly the one desired when they first start to operate. Furthermore, they can be removed very readily and, as indicated, the reel will then be in the condition shown in Fig. 6 and can be used as a bar reel for all the purposes for which bar reels have been employed heretofore. It is the same reel and can be used in the same kettles so that separate kettles do not have to be kept on hand for the hump reels and the bar reels. In this way a mill can dye stock in string or rope form in one shade and then, in a surprisingly quick time, clean the humps and dye the stock any other shade or color. No mixture of the color results.

Although I have illustrated and described only one form of the invention I am aware of the fact that modifications can be made therein by any person skilled in the art without departing from the scope of the invention as expressed in the claims. Therefore I do not wish to be limited in this respect but what I do claim is:—

1. As an article of manufacture, a bar reel comprising a central frame having seats therearound and a series of metal bars secured one in each of the said seats, the central frame having a series of sides between said seats, frames detachably secured to said sides and humps on said frames arranged circumferentially and located between the bars.

2. In a reel of the character described, the combination of a central spider having a series of sides equally spaced apart and alternate seats located between each two adjacent sides, plates extending from said seats substantially radially, hollow sheet metal bars mounted in said seats and secured to said plates, longitudinal frames secured detachably to said sides and projecting nearly as far as the bars, and circumferential humps carried by said frames and spaced apart and staggered throughout the length of the bars.

3. As an article of manufacture, a dyeing reel having smooth surfaced transverse hollow metal humps arranged around it in a plurality of series to insure rolling of the goods to reduce dye wrinkles and longitudinal frames carrying said humps in staggered relationship.

4. As an article of manufacture, a reel frame having alternating longitudinal bars and transverse humps, said humps being detachable to adapt the reel for use as a hump reel or a bar reel and both the humps and bars projecting beyond said frame.

5. As an article of manufacture, a bar reel comprising a central frame having seats spaced therearound and a series of longitudinal bars secured one in each of the said seats and projecting beyond said frame, and arcuate humps arranged circumferentially and located between each two bars and projecting beyond the bars.

WARREN J. SIMONDS.